July 12, 1960
B. A. SWANSON
2,944,520
FLUID MOTOR WITH ROTARY AND/OR RECTILINEAR MOVABLE PISTON
Filed Sept. 13, 1954
3 Sheets-Sheet 1
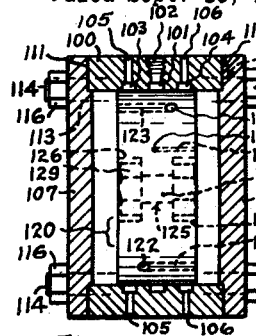
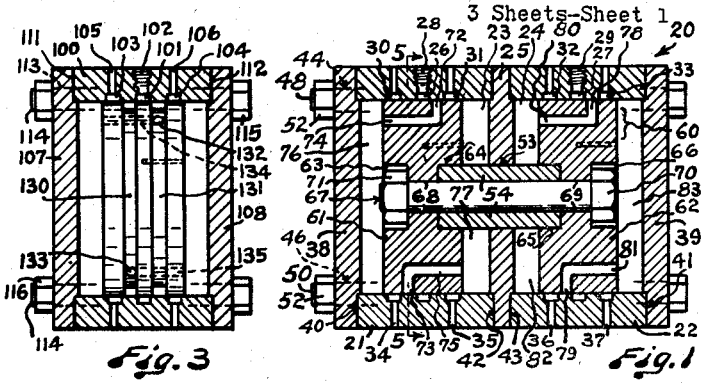
INVENTOR
Bernard A. Swanson
BY
ATTORNEY July 12, 1960     B. A. SWANSON     2,944,520
FLUID MOTOR WITH ROTARY AND/OR RECTILINEAR MOVABLE PISTON
Filed Sept. 13, 1954     3 Sheets-Sheet 2
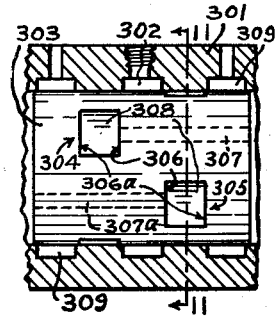
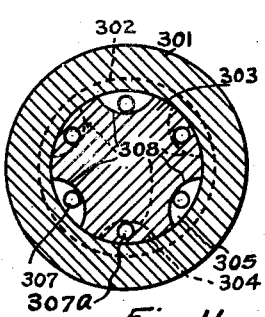
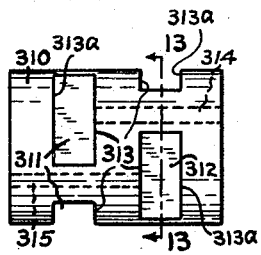
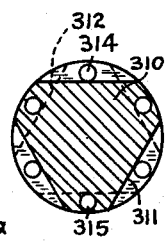
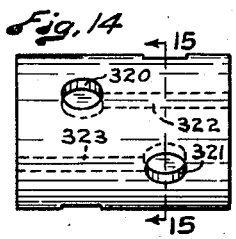
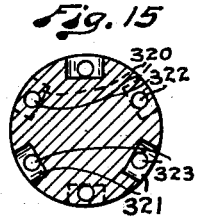
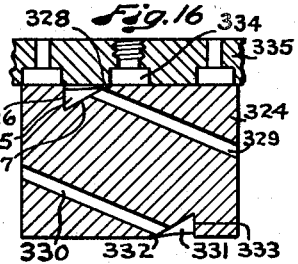
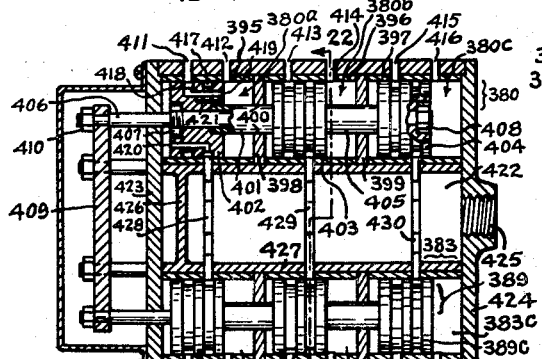
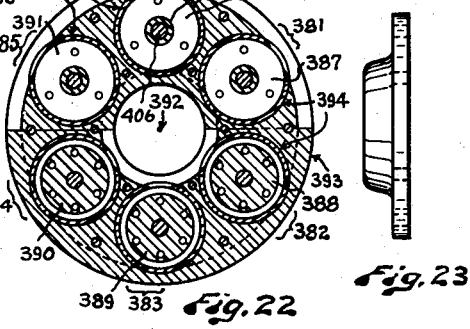
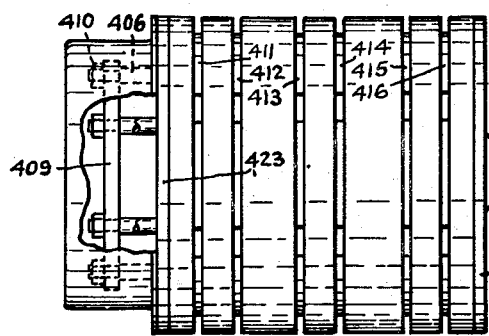
INVENTOR
Bernard A. Swanson
BY
ATTORNEY

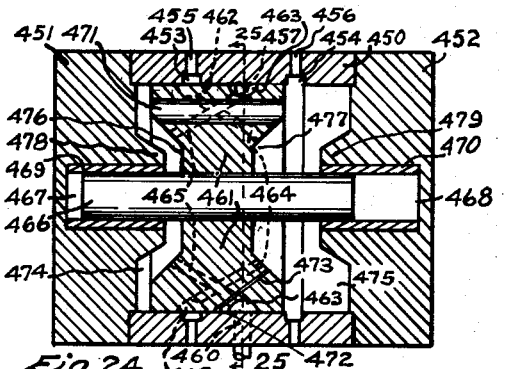

United States Patent Office 2,944,520
Patented July 12, 1960

---

2,944,520

FLUID MOTOR WITH ROTARY AND/OR RECTILINEAR MOVABLE PISTON

Bernard August Swanson, 2710 Eastern Ave., Sacramento, Calif.

Filed Sept. 13, 1954, Ser. No. 455,512

26 Claims. (Cl. 121—17)

My invention and discovery relate to a fluid pressure medium reciprocating multiple engine, characterized by having (a) multiple units providing multiplied power using standard pressure, and (b) vibration induced by a piston having combined two directional motions, rectilinear and rotary, or rectilinear only.

More particularly my invention and discovery relate to providing for said features in a combined engine, or for an engine characterized by employing one unit of said multiple engine, or for one engine having a piston having combined two directional motions, rectilinear and rotary.

Standard air compressor equipment is commonly designed to supply fluid pressure at 90 to 110 pounds at the tool and this pressure may not provide the magnitude of shock or force of vibration at required high frequency in reciprocating piston devices. Moreover, some vibration requirements are best served by a type of rectilinear vibration and others by vibration induced by unbalanced rotary motion. The fundamental object of my invention and discovery is to provide an engine which meets these requirements as well as those further set forth herein. I will now proceed to set forth each of these features, taking them up separately in order that the invention and discovery may be the better understood. However, let it be definitely noted that the various features may be combined in a single engine in obtaining the optimum advantages of my invention or they may be employed singly in an engine.

Particularly my invention and discovery relate to a fluid pressure medium reciprocating piston engine operating in all fields where fluid pressure reciprocatory mechanisms are operated characterized by having a composite cylinder member formed of a plurality of individual compartments or cylinder units in which member a composite piston member is disposed formed of a plurality of piston units each of which is disposed in one of the enclosing compartments or enclosing cylinder units of said cylinder member. Each unit of the cylinder with its piston unit of cylindrical form constitutes a complete engine with separate inlet and exhaust means for each piston unit so that the fluid pressure is admitted simultaneously to the corresponding ends of each of the pistons of said units during reciprocation in one direction, and for applying fluid pressure to the other end of each piston of each unit when reciprocating in the opposite direction. Thus is provided a multiple engine of a construction which readily permits the adding of other units thereto in forming a multiple engine, i.e., one formed of a plurality of units but operating as a single engine—the end surface of the piston most remote from the center of the cylindrical piston receiving the fluid pressure thereon in causing reciprocation.

Furthermore, more particularly my invention and discovery relate to providing said fluid pressure mechanism in which the rate of reciprocations may be maintained of a required predetermined magnitude and the pressure of the pressure fluid remains as a constant factor and at the same time the weight of the composite piston may be increased many fold in providing the necessary force or shock of vibration.

A fundamental and primary object of my invention and discovery is to provide for reciprocating at very high speed or rate of reciprocation a piston of greater mass than is otherwise possible, so far as is known to me, using the common practice magnitude of fluid pressure at the tool. For example, by way of illustration, and not limitation, it is possible, where a 1 lb. piston is reciprocated at 15,000 reciprocations per minute with a given standard fluid pressure medium at the tool, by means of my invention and discovery to reciprocate a piston of 10 lbs. or more at the same rate of reciprocation on the same magnitude of standard fluid medium pressure with a piston of no greater diameter.

My invention and discovery will be illustrated by setting forth a specific problem confronted in industry. Also such illustration will render clear how my invention overcomes and solves a definite problem: In the manufacture of concrete pipe of large diameter such as 6 feet, and 30 feet long and weighing approximately 12 tons, it is necessary to provide a given density for the concrete, i.e., for the removal of entrapped air, and such removal is a matter respecting which legal requirements have been imposed. One jurisdiction requires that the vibratory mechanism attached to the forms in which the concrete is poured must be subjected to a vibration at the rate of not less than 10,000 reciprocations or vibrations per minute and this with a weight of vibratory member sufficient to do the job required. To supply the necessary force for the blow or shock of vibration, a certain weight of piston must be employed. This gives rise to the problem of supplying such force of vibration with the fluid pressure delivered at the tool under a pressure of about standard 90 pounds of air. Such being the normal or ordinary pressure of the fluid medium involves a limitation as to the maximum weight of the vibratory member that can be moved under such magnitude of pressure.

The object of my invention is to provide a fluid pressure medium reciprocating mechanism that will operate a piston at the required speed of reciprocation and of such weight as to supply the magnitude of shock or force in effecting or accomplishing the desired job, and in so doing operating with the standard 90 pound air pressure supplied at the tool. The attainment of this result is an accomplished fact by a mechanism embodying my invention and discovery herein set forth.

In employing vibratory mechanism to perform the various jobs of industry, it is recognized that each job or application, for its most efficient and complete performance, requires a specific rate of vibration, a specific force of vibration, and a specific type of vibration. However, it is equally well recognized that the equipment provided by present day practice consists of a tool or single mechanism to cover a considerable range of jobs and thus is not fully adapted to meet the particular requirement of a given job. The present common practice devices are therefore a compromise and are not so designed as to give the proper vibrations for each job or permit change in adapting them to a specific job. Accordingly, it is a primary object of my invention to provide a vibratory mechanism of such construction that it may be readily adapted to more nearly meet the specific requirements of a given job or application by adding such engine assemblies from parts which are stocked as will more practically meet the special requirements of a special job.

One of the considerations that has militated against providing vibratory mechanism best suited for each particular job or application is the fact that the equipment which provides the fluid pressure is very much standardized to provide a fluid pressure of 90–100 pounds at the tool. It is one of the objects of my invention to provide a vibratory mechanism which will operate upon the standard pressure of 90–110 pounds at the tool and which will meet the specific requirements as to rate of reciprocation, magnitude of force or shock of vibration, and type of vibration.

Also, it is a further object of my invention to provide such multiple fluid pressure medium reciprocating mechanism or engine composed of individual units which may be readily coupled together to provide the necessary increased force of vibration while maintaining the rate of vibration or reciprocation and still operate on the standard 90 pound pressure of fluid medium at the tool. That is, if the engine of one cylinder is designed to operate with a one-pound piston at a given rate of vibration or reciprocation with air pressure at the tool of 90 pounds, then if increased weight of piston for increased shock or power of vibration is desired, my invention provides for coupling together other motor assemblies or units with one-pound piston units until the desired total weight of piston is provided, still maintaining the same rate of vibration and the same fluid pressure as employed in the original engine of one cylinder. In short, it is an object of my invention and discovery to provide said reciprocating multiple engine of a character which is formed of units which may be stocked and assembled in various combinations to provide a reciprocating mechanism adapted to supply a definite rate of reciprocation, a definite force of blow or shock (i.e., one having a piston of necessary weight), and a definite length of stroke, type of vibration, and speed, operating on the usual ordinary standard 90-lb. pressure of fluid medium at the tool. Thus, such a fluid pressure mechanism of my invention and discovery is one which can have parts replaced readily and one which is readily adaptable to many variable requirements or demands, the same being capable of being assembled from units carried in stock.

It is a further object of my invention and discovery to provide a multiple fluid pressure mechanism having a piston which creates vibrations induced by a reciprocatory motion combined with a rotary motion. Such an engine or unit may be substituted in the disclosure of the preceding paragraph.

It is academic that various applications of fluid pressure medium devices or engines require a different type of vibration as well as a different rate of vibration and also a different force of vibration. The multiple fluid pressure engine of my invention and discovery renders it possible to provide a definite mechanism to meet all all these requirements and still employ and operate upon standard 90-lb. pressure medium at the tool. By having the mechanism of a composite character and assembly of units both as to cylinder and as to piston, it is possible to adapt or adjust the device to meet the requirements of a particular application. The providing for the multiple unit makes it possible for ready assembling of the structure upon mechanism previously employed as well as to provide for meeting a new type of vibration or an increased force of vibration. Such new type of vibration may be one involving a short or long stroke of the piston or involving a type of vibration supplied by an unbalanced operation of piston—both reciprocatory and rotary. Let it be noted that this matter of type of vibration is one of wide scope, and proceeds into a field of deep scientific research and study. Just how high speed and other conditions of vibration operate to provide efficiency is not fully understood. The type of vibration is one of fundamental importance and positively must be considered in meeting and solving the requirements of some particular applications.

A very important feature of my invention and discovery in providing for the proper type of vibration relates to the providing of a piston which creates vibrations induced by two directional motions, one by reason of the rectilinear reciprocating motion of the piston and the other by reason of a rotary motion of the piston which may be weighted on one side in providing an unbalanced rotation and therefore incident to a rotary motion. The compressed fluid is received or strikes the piston tangentially or at an angle to the longitudinal axis of the piston, thereby imparting a jet or turbine-like action which causes the piston to revolve upon its longitudinal axis at a desired speed while at the same time it is reciprocating in meeting the requirements of a particular job. This double motion has particular application in vibrators as well as in various types of tools such as impact wrenches, nut runners, drills for rocks, or mining operations (cited by way of illustration and not limitation).

Manifestly, to obtain the optimum results of my invention and discovery, these various features may be combined in a single device or they may be employed separately in providing for the requirements of a specific application. Where a heavy shock or vibration is required the multiple engine may be used; likewise, where a vibrator providing particularly for the two types of motion is required then the rotary form of my invention may be employed. Where a heavy shock or great force of the two types of motion is required, then these may be combined in a single engine as herein disclosed in order to provide for the benefits of my invention fully.

The above-mentioned general objects of my invention, together with others inherent in the same, are attained by the mechanism illustrated in the accompanying drawings, the same being preferred exemplary forms of the embodiment of my invention throughout which drawings like reference numerals indicate like parts:

Figure 1 is a view in longitudinal section of an engine embodying my invention and discovery wherein a twin compartment or composite cylinder member having two cylinder units is shown with a composite two-unit smooth piston member, each of which piston units is separately disposed in one of said compartments or cylinder units, each of which cylinder units has its individual pressure means as well as its separate exhaust means and each piston unit has its own separate inlet-exhaust porting means;

Fig. 2 is a view in longitudinal section of a single unit smooth surface piston of my invention adapted to be assembled in a composite member involving a plurality of such units as well as to be employed as a single unit;

Fig. 3 is a view in longitudinal section of a single unit hill and valley type of piston of my invention adapted to be assembled in a composite member involving a plurality of such units as well as to be employed as a single unit;

Fig. 4 is a view in longitudinal section with parts in elevation of a multiple engine formed of a plurality of units embodying my invention and discovery, a composite cylinder of four cylinder units with a composite piston of four piston units, each of which is disposed in one of said cylinder units being shown;

Fig. 5 is a view in cross-section on dotted line 5—5 of Figure 1;

Fig. 6 is a view in longitudinal section of a modified form of the multiple engine of my invention and discovery showing the composite piston member formed of a plurality of piston units integrally formed as one integral unitary structure;

Fig. 7 is a view in expanded perspective of a compartment separator wall for the modified construction of Figure 6;

Fig. 8 is a view in longitudinal section of a modified form of the piston member formed of individual units of the cap screw type;

Fig. 9 is a view in longitudinal section of a still further modified form of piston member showing piston units of still another modified form held together by cap screws;

Fig. 10 is a view in longitudinal section of a modified form of an inlet-exhaust port of my invention which is of an arcuate pocket form disposed at a right angle to the longitudinal axis of the piston and having parallel lateral walls;

Fig. 11 is a view in cross section on line 11—11 of Fig. 10;

Fig. 12 is a view in side elevation of a further modified form of an inlet-exhaust port of the piston of my invention in the form of a slot extending straight across at right angles to the axis of the piston, the lateral walls being parallel;

Fig. 13 is a view in cross section on line 13—13 of Fig. 12;

Fig. 14 is a view in side elevation of a further modified form of an inlet-exhaust port of my invention of an enlarged cylindrical form slightly less in diameter than the width of the inlet and exhaust channels of the cylinder;

Fig. 15 is a view in cross section on line 15—15 of Fig. 14;

Fig. 16 is a view in longitudinal section of another modified form of an inlet-exhaust port of my invention, the wall on one side of which is straight and radially disposed with respect to the longitudinal axis of the piston and the opposite wall is beveled or inclined with respect to the radial wall and of a semi-conical form, the parts of said form being arranged with their tapered walls inclined downwardly toward their respective end portions of the piston;

Fig. 17 is a fragmentary view in elevation of the piston shown in Fig. 16;

Fig. 18 is a view in longitudinal section of a modified form similar to that of Fig. 16 in which the tapered, semi-conical form walls are arranged with respect to each other with said tapered walls disposed upwardly inclined toward their respective end portions of the piston;

Fig. 19 is a fragmentary view in side elevation of the piston shown in Fig. 18;

Fig. 20 is a view in longitudinal section of a modified form of a multiple engine of my invention with the piston units disposed radially and circularly about the longitudinal axis of the engine;

Fig. 21 is a view in elevation with parts broken away of said modified form of Fig. 20;

Fig. 22 is a view in cross section taken substantially on broken line 22—22 of Fig. 20;

Fig. 23 is a detached edge view of a modified form of piston connector plate having a head for delivery of hammer blows;

Fig. 24 is a view in longitudinal section of the cylinder and piston of a modified form of my invention providing two directional motions, rectilinear and rotary;

Fig. 25 is a view in cross section on broken line 25—25 of Fig. 24 through a set of inlet ports;

Fig. 26 is a view in longitudinal section of a modified form of my invention similar to that of Fig. 24 with exhaust outlets in the cylinder providing for exhausting of the fluid pressure from the inlet-exhaust pockets;

Fig. 27 is a view in cross section of a modified form similar to that of Figs. 24 and 25, but the cylinder is provided with a pressure fluid inlet circumferential channel radially of the turbine-like pockets of the piston.

Fig. 28 is a view in longitudinal partial section of a modified form of my invention similar to that of Fig. 27 with the piston mounting means comprising stub shafts extending axially part way through the piston;

Fig. 29 is a view in longitudinal section of a modified form of my invention with the piston shaft fixedly mounted and extending axially through the piston—the piston being longitudinally and rotatably mounted on said shaft;

Fig. 30 is a view in longitudinal section of a modified form of a fluid pressure engine embodying my invention combining the features of multiple action and double vibration induced by a piston having two directional motions, rectilinear and rotary;

Fig. 31 is a view in longitudinal section of a modified form of my invention similar to that of Fig. 24, with the shaft or mounting omitted;

Fig. 32 is a view in longitudinal section of a modified form of my invention and discovery embodying two directional motions with a piston having on one end portion inlet-exhaust ports disposed in a channel of the hill and valley form, and on the other end of the piston inlet-exhaust ports of the turbine-like pocket form; and Fig. 33 is a view in longitudinal section of a modified form of my invention and discovery embodying two directional motions with a piston having in each end portion inlet-exhaust ports disposed in a channel of the hill and valley form, and pockets of turbine-like form disposed intermediate (longitudinally considered) said first-named inlet-exhaust ports.

In the form of the multiple engine of Figure 1 a composite cylinder member 20 is shown having cylinder sections 21 and 22 forming individual cylinder units or compartments 23 and 24 formed by separator compartment wall 25. Each of the compartments 23 and 24 has its inlet fluid pressure channel 26 and 27, and these respectively have their passageways 28 and 29 communicating with a source of fluid pressure medium which may be a single common source or reservoir (not shown) or separate sources or reservoirs but preferably of the same fluid medium pressure; however, they are not required to be of the same pressure. Each compartment 23 and 24 also has its pair of exhaust channels 30 and 31, and 32 and 33. Said exhaust channels 30 and 31, and 32 and 33 are spaced on each side of the inlet channels 26 and 27 in conformity with the porting of the piston to be associated therewith. Said exhaust channels 30, 31, 32 and 33 have exhaust passageways 34, 35, 36 and 37 respectively, end members 38 and 39 close the said compartments 23 and 24, said end member preferably having annular recesses 40 and 41 respectively. Likewise, separator compartment wall 25 preferably has annular recesses 42 and 43. Said recesses 40, 41, 42 and 43 provide seats for the cylinder sections 21 and 22 for insuring compressed fluid tightness. Said end members 38 and 39 also have openings or bolt holes 44, 45, 46 and 47 through which uniting bolts 48, 49, 50 and 51 may be passed in securing the cylinder compartments in a unitary structure, i.e., the composite cylinder member 20—the said bolts having securing nuts 52 on the ends of each of said bolts. Separator compartment wall 25 has an opening 53 in which opening is slidably mounted a spacer-aligning sleeve 54.

A composite piston member 60 formed of the two piston units 61 and 62 mounted and enclosed respectively in compartments 23 and 24, said piston units 61 and 62 being of the smooth circumferential face type (smooth and continuous face from end to end being only interrupted by ports) preferably having on their end faces recesses 63, 64, 65 and 66 respectively. The end portions of spacer-aligning sleeve 54 tightly fits in the recess 64 of the piston unit 61, and recess 65 of piston unit 62. A piston unit uniting bolt 67 extends through the spacer-aligning sleeve 54 and through axial openings 68 and 69 in piston units 61 and 62 respectively; said piston bolt has a permanent head 70 on one end and a threaded nut 71 on the other end, thereby forming a unitary structure or composite piston member 60 which member slidingly reciprocated through the separator compartment wall 25. Said head 70 being disposed in recess 66 of piston unit 62 and threaded nut 71 is disposed in recess 63 of piston unit 61. Of course, other forms equivalent to said bolt may be employed. Said spacer-aligning sleeve 54 is mounted on piston bolt 67. Piston unit 61 has inlet-exhaust ports 72 and 73, which ports have passageways 74 and 75—passageway 74 extending to end portion cylinder chamber 76 and passageway 75 extending to end portion cylinder chamber 77, i.e., each passageway extends to that end face of the piston most remote from its inlet-exhaust port.

Likewise, piston unit 62 has inlet-exhaust ports 78 and 79 and passageways 80 and 81 respectively extending to end portion cylinder chamber 82 and to end portion cylinder chamber 83, all of which construction for piston unit 62 is identical to that of piston unit 61.

In Fig. 2 is shown a structure which may operate as a cylinder member and a piston member or as a cylinder unit and a piston unit to be combined with like units in forming a composite structure both as to cylinder and as to piston. For purposes of description the term cylinder member has been used as applied to the overall composite cylinder structure formed of individual cylinder units. Likewise, the term piston member or composite piston member has been used as applied to the entire piston unitary structure formed of piston units. In Fig. 2, if the structure there shown is to be employed as a single member then the cylinder portion becomes a cylinder member. When it is to be used as a subcombination to be applied with other like structures, then it becomes a unit having a cylinder unit and a piston unit. Cylinder section 100 has the inlet fluid pressure channel 101 which in turn has passageway 102 communicating with a source of fluid pressure medium (not shown). On each side of inlet-channel 101 are disposed exhaust channels 103 and 104 in conformity with the porting of the piston to be associated therewith. These channels have passageways 105 and 106 leading from such channels for exhausting purposes. End members 107 and 108 preferably have annular recesses 111 and 112 for recessing the end portions of cylinder section 100 thereby providing for air tightness. End members 107 and 108 have openings 113 disposed in corners of the end members after the manner shown in Fig. 5 for the end members 38 and 39 of the multiple engine shown in Figure 1. Through these openings 113 are disposed bolts 114 having heads 115 and threaded securing nuts 116. Thus is formed a single compartment cylinder demountable and of a character to be united with other like cylinder section units to form a composite cylinder.

Within the cylinder chamber formed as above set forth is disposed and enclosed the piston structure 120 of the circumferential smooth face type having inlet-exhaust ports 121 and 122 having passageways 123 and 124 within the piston structure, each passageway leading to the piston face of that end of the piston most remote from said inlet-exhaust ports. Moreover, said piston structure preferably has an axially longitudinally disposed opening or hole 125 which opens into axially disposed recesses 126 and 127 disposed in each end portion of the piston structure. In said opening and said recesses is provided a removable filler member which may be various forms but, as shown, a bolt 128 secured in place by nut 129. When a piston structure of Fig. 2 is combined with other like structures, then the filler members 128 and 129 are removed and a piston bolt similar to 67 of Figure 1 would be caused to extend through hole 125 and a spacer member 54 would be mounted thereon as in Figure 1. The demountable structure shown in Fig. 2 may be employed as an individual vibrating member or it may be combined with other like units as shown in Figure 1 to form a composite or multiple engine mechanism in providing increased power or force of vibration by means of an increased weight of piston without requiring increased fluid medium pressure and without alteration of the required rate of vibration. The piston 120 is preferably provided with a starter orifice 120a having longitudinal passageway 120b.

In Fig. 3 the cylinder structure is identical in all respects with that shown in Fig. 2 so that the same numbers are applied to each and all of the parts. Fig. 3 departs from the structure shown in Fig. 2 as respects the piston structure which is of the "hill and valley type." Grooves or channel ways 130 and 131 are cut in each end portion thereby providing for end lugs with a median lug between said channels, the said piston has inlet-exhaust ports 132 and 133 having passageways 134 and 135 respectively communicating with the end faces of the piston structure, each of said inlet-exhaust ports communicating with that end of the piston most remote.

The demountable structure of Fig. 3 may be employed as a single and independent vibrating mechanism or it may be combined with other like structures to form a composite multiple engine. In so doing, the piston structure 120 shown as a solid unit would be provided with an axial opening similar to 125 and with recesses 126 and 127 of Fig. 2 to receive a bolt such as 67 of Figure 1 and a spacer member 54.

In Fig. 4 a fragment of a multiple engine illustrating four units embodying my invention and discovery is shown particularly in longitudinal section and particularly in side elevation. Cylinder sections 150, 151, 152 and 153 are shown. Said sections having separator compartment walls 154, 155, 156 thereby forming cylinder compartments or cylinder units. Each cylinder section has inlet fluid pressure annular channel 157 each of which inlet channel has passageway 158. Each of said cylinder sections has a pair of exhaust channels 159 and 160, i.e., one of said channels being disposed on each side of said inlet channel 158 and each of said exhaust channels having exhaust passageways respectively 161 and 162. End plate 163 closes the end of compartment 150—the opposite end plate being omitted showing that other like cylinder section units may be added as may be desired. The cylinder sections are held together by bolts 164 which are broken off at 165 to show that these may continue on for the adding of other cylinder sections or units.

Within the composite cylinder thus constructed is mounted and enclosed a composite piston member formed of piston units 170, 171, 172 and 173. Each of these units has an inlet-exhaust port 174 and 175, and each of these inlet-exhaust ports has a passageway 176 and 177 respectively leading to the end face of the piston which face is most remote from the inlet-exhaust port respectively. Each of said separator compartment walls 154, 155 and 156 is provided with an axial opening or hole 178 in which opening is slidably mounted an aligner spacer member 179. Each of said piston units has an axial opening or hole 180 opening into recesses 181 and 182 in which the end portions of spacer members 179 are tightly fittingly received. A uniting piston bolt 183 extends through each of the openings 180 of the piston units thereby providing for the securing of all of said units into a unitary composite structure or piston member. The piston bolt 183 is shown broken off at 184 indicating that this may be extended in joining other like units in forming a multiple engine having more than the four piston units illustrated in Fig. 4 of my invention and discovery.

The mechanism described and shown in Figs. 1–5 is especially adapted for use as a vibrator mechanism but may be readily adapted for use as a hammer and other tools as shown in the modified form of the device as shown in Fig. 6 and the disclosure relative thereto as next set forth below.

In the modified form of the device shown in Fig. 6, the multiple engine of my invention and discovery is especially adapted to use as a hammer type of fluid pressure operated engine and has the composite cylinder 200 constructed of cylinder sections or units 201, 202, 203 and 204, each of which is provided with inlet fluid pressure medium channels 205, 206, 207, and 208, having passageways 209, 210, 211 and 212 respectively preferably located midway of each section. On each side of said inlet channels are exhaust channels 213 and 214, 215 and 216 disposed in conformity with the porting of the piston to be associated therewith, said exhaust channels having passageways 217, 218, 219 and 220 respectively for each of said exhaust channels. Cylinder compartments 223, 224, 225 and 226 are provided for each section by separator compartment walls 227, 228 and 229. Said cylinder member having end members 230 and 231 held in place by bolts 232 extending through and held by nuts 233 arranged after the manner shown in Fig. 5, for bolts 48, 49, 50 and 51.

Within the cylinder member is disposed and enclosed a composite piston member 240 formed of piston units 241, 242, 243 and 244 each of which is disposed respectively in cylinder compartments 223, 224, 225 and 226. In this modified form of my invention and discovery the said composite piston is formed as a single solid integral structure, the same being cast as a unit. The separator compartment walls 227, 228 and 229 are formed in each case of two members 245 and 246, Fig. 7. This divided construction for the separator compartment walls is required by reason of the fact that in assembling the same upon the spacer connector portion 247, 248 and 249 of the piston member, the said members 245 and 246 of a suitable material are inserted sidewise. The connector or seal wedges 250 and 251 are disposed in the keyways 252 and 253 for each of the members 245 and 246. This modified form of the piston member provides a very strong and rigid structure and one which prevents any necessity for making provision for locking the units together and to withstand the heavy vibration shocks. This construction is particularly suitable for large units. In pile driving, rock drills, rock and concrete breakers, such a sturdy construction is well adapted (to cite a variety of applications by way of illustration but not limitation). Specific changes in adapting this construction are made as specific application may require.

The piston member has projection 254 extending into end plate 230 which engages the end portion of a tool member 255 when in reciprocation held in position by extension or chuck 256 on the end plate. Portion 254 hits the end portion of tool member 255 in reciprocating.

Each of the piston units has inlet-exhaust ports 257 and 258 with passageways 259 and 260 connecting said ports with that end face of the piston unit most remote for the respective port. Each of said piston units has a starting orifice (i.e., a very small opening) 261 and a passageway 262 leading in the same direction to a like located face of each piston unit. Said orifice is located midway between the faces of each piston unit in providing for starting the piston in the event the piston comes to rest in dead center. The operation of the fluid pressure in the modified form shown in Fig. 6 may be the same as that shown for corresponding parts for Figure 1.

In Fig. 8 is shown a modified form of the composite piston 270 of piston units 271, 272, 273 and 274. Piston units 271, 272 and 273 are of the cap screw type, each of which have heads 275 and threaded end portions 276, while piston unit 274 is of the nut type threadedly mounted on the threaded end portion of piston unit 273. The stem part 277 of piston units 271, 272 and 273 function as spacer means for the piston units. Each of said piston units have inlet-exhaust ports 278 and 279 respectively with passageways 280 and 281 which lead to that end face of each piston unit most remote from its inlet-exhaust port precisely as set forth in the piston units described in Figure 1. Also, a starter orifice 282 with its passageway 283 is preferably provided for each of said piston units 271, 272, 273 and 274, said starter orifice operating as other such orifices as previously set forth herein.

In Fig. 9 is illustrated a still further modified form of a composite piston member 290, formed of two piston units 291 and 292 of which piston unit 291 is of the cap screw type without the threaded end portion and piston unit 292 is of a plain face piston held to piston unit 291 by means of cap screws 293 and 294. Fig. 9 illustrates another way of securing the piston units together in multiple fashion, i.e., another of the piston members which may be of two or more piston units. Piston units 291 and 292 each have exhaust-inlet ports 295 and 296 with passageways 297 and 298 respectively leading to that face of the piston most remote from the port as described in Figure 1. Also, each of said piston units 291 and 292 preferably have starter orifice 299 with its passageway 300 leading to a like face of each piston unit as described for Figure 1.

Relative the modified form of inlet-exhaust ports shown in Figs. 10 and 11: The cylinder 301 has the inlet channel 302. Piston 303 has two sets of inlet-exhaust ports 304 and 305, each set as shown having three ports, which ports are each in the form of an arcuate parallel-walled cavity or pocket. These ports are disposed in a circle in the circumferential portion of the piston, the plane of which circle is normal to the axis of the piston. This pocket extends cross-sectionally of the longitudinal axis of the piston with parallel side walls 306 and 306a and communicates with the longitudinal passageways 307 and 307a respectively. Thus, is provided an inlet-exhaust port of a pocket form which may receive under full pressure of the predetermined pressure for the tool a volume of compressed fluid medium when the piston is in reciprocation and said pocket is in registration with the fluid inlet channel 302 of the cylinder 301. Such form of pocket is preferably cut with a circular saw or keyway cutter which causes the bottom wall 308 of the cavity or pocket 304 and 305 to be cured (Fig. 11), and this curving facilitates the passing of the fluid medium.

The form of this pocket 304 or 305 provides for a volume of compressed fluid to be received from the inlet channel 302 in a brief instant of time. This form of port has an extended arcuate opening in the piston which registers in its reciprocation with a portion of the inlet channel 302 in the cylinder 301 and thus is provided for a very quick reception of a volume of compressed fluid to be received from the inlet channel 302. This form cooperates in producing a higher rate of reciprocation in comparison to the straight-hole type of inlet-exhaust port in the smooth piston as shown in Figure 1. The volume of compressed air received in the port or pocket can proceed to expand after the reciprocation of the piston has cut off registration with the fluid inlet channel 302.

Likewise, upon exhausting of the compressed fluid such fluid medium has an opportunity to exhaust faster than it would where the port is of a straight radial opening substantially of a diameter equal to that of the longitudinal passageway, as shown in Figure 1 for example.

This arcuate pocket form of inlet-exhaust port 304, 305, is designed particularly for use in the smooth surface piston. This form of inlet-exhaust port is especially adapted for a relatively short piston. The distance between the inner radial walls 306 (longitudinally considered) of the ports 304 and 305 must be greater than the width of inlet channel 302 and exhaust channel 309 in the cylinder to provide maintaining reciprocation. Starting orifice 302a and passageway 302b provide for starting the piston if it should stop on dead center.

Relative to modified form of inlet-exhaust port of piston 310 shown in Figs. 12 and 13:

In this instance the inlet-exhaust port or pockets 311 and 312 extend straight across the peripheral portion of the piston and are in the form of a slot having radial walls 313, 313a said pockets each being in communication respectively with its longitudinal passageway 314—port 312 having its longitudinal passageway 315. This form of the inlet-exhaust port provides for an extended area of the inlet-exhaust ports to be in registration with the inlet channel of the cylinder not shown.

Likewise in this form of the inlet-exhaust port the distance between the inner walls 313 of ports 311 and 312 (longitudinally considered) must be greater than either the inlet or the exhaust channels in the cylinder (not shown) as in Fig. 10. Duplicate sets of inlet-exhaust ports are provided as shown and explained for Fig. 11 (see Fig. 13).

Relative the modified form of inlet-exhaust port shown in Figs. 14 and 15: Here the inlet-exhaust ports 320 and 321 communicate with longitudinal passageways 322 and 323 of the piston. Said passageways ordinarily, in this modified form, will be of a diameter considerably smaller than the diameter or width of the inlet-exhaust port or pocket in the piston. This modified form of an enlarged cylindrical form provides for the reception of a volume of compressed fluid medium and also provides for quicker reciprocation than in the ordinary port form shown in Figure 1. Duplicate sets of inlet-exhaust ports (see Fig. 15) are provided as shown and explained for Fig. 10.

Relative the modified form of inlet-exhaust ports of piston 324 shown in Figs. 16 and 17: The port or pocket 325 has straight or radial walls 326 and the inclined or tapered wall 327 of semiconical form having an apex 328 and being connected with a longitudinal passageway 329, inclined to the axis of the piston.

As in the various pistons shown and illustrated, there may be a plurality of the longitudinal passageways such as a second passageway 330 having its inlet-exhaust port 331 which is shown with its apex 332. The inlet-exhaust ports of this form are disposed with respect to each other with the semiconical wall sloping downwardly from the apices 328 and 332 toward the adjacent end portion of the piston 324. Port 331 has a straight radial wall 333 similar to wall 326 of port 325.

The operation of this arrangement of the inlet-exhaust ports of this modified form consists in producing a gradual reception of the fluid pressure from the inlet channel 334 of cylinder 335 as the apex 328 moves further and further into registration with said inlet channel; and likewise for 332 when the piston is moved in the opposite direction. Thus, there is a longer stroke provided for the piston and a heavy blow given by the piston, thus adapting it particularly for tools operating after the manner of a hammer or driver.

Relative the modified arrangement of inlet-exhaust ports shown in Figs. 18 and 19: The inlet-exhaust ports 340 and 341 of piston 342 which are the ports shown in the longitudinal section of these figures are of the same general character as shown in Figs. 16 and 17 but are arranged in the piston in a different manner. The port 340 has the straight radial wall 343 and the inclined tapered wall 344 of semi-conical form communicating with longitudinal passageway 345. Exhaust port 341 has straight radial wall 346 and inclined or tapered wall 347 of semi-conical form and said port communicates with passageway 348. In the arrangement here shown, the beveled or inclined walls 344 and 347 are sloped upwardly toward their respective end portions of the piston, thus bringing the straight radial walls inwardly disposed. This arrangement of the inlet-exhaust ports provides for a very sudden reception of a volume of inlet pressure fluid medium when the piston in its reciprocation moves the straight wall into registration with the inlet channel 349 of the cylinder 350. The semi-conical curved wall facilitates to a high degree the passing of the inlet fluid to the respective longitudinal passageways 345 and 348 of the inlet-exhaust ports of this modified form and arrangement. This form of the port 340 and arrangement of said ports particularly produces a very high speed of reciprocation.

The longitudinal passageways 329 and 330 in the modified form shown in Figs. 16 and 17 and the passageways 345 and 348 of modified forms shown in Figs. 18 and 19 are purposely preferably designed to be inclined in order to maintain the escape of the air in a straight course as near as may be, in order to facilitate to the utmost the entry and the exhaust of the fluid medium—especially in providing speed of reciprocation and elimination of back pressure or air restriction.

In a mechanism of the character of my invention, let it be remembered that a feature of detail which facilitates, even in what appears to be a very slight degree, is not to be considered unimportant. The invention deals with matters that are very small magnitude so far as time is concerned, yet every feature which facilitates the speed entry of the fluid pressure medium and the exhausting thereof is of fundamental importance for the efficient and successful operation of the machine. For example, cited by way of illustration and not limitation, the modified forms of ports and the inclined longitudinal passageways, separately and in combination, contribute to enabling the inlet fluid medium to enter with less friction and likewise allows, upon exhausting, the compressed medium to escape with less friction, and all these features separately and in combination contribute to making it possible for this mechanism to accomplish results which have not heretofore been obtained.

The shape of the inlet-exhaust ports and the arrangement with respect one to the other provide a new functional relationship which has been found to facilitate the providing for a degree of rate of reciprocation necessary, and at the same time to provide for employing the fluid pressure under standard and commonly used pressure magnitudes, normally between 90 and 110 pounds in providing a vibration of the required force or shock.

The invention herein set forth provides for employing a commonly supplied magnitude of fluid pressure and at the same time increasing the rate of reciprocation and increasing the weight of the piston involved so as to produce a blow of the desired greater force which a particular installation may require. Thus, where the law requires, as in the case of the vibration of the forms for the construction of a concrete structure, the reciprocation rate of a certain magnitude to produce the necessary vibration to remove the air within the concrete mix in obtaining the desired density, my invention provides for employing the standard compressor equipment for providing fluid pressure of the standard magnitude of about 90 pounds to 110 pounds at the tool, and at the same time provides for obtaining the necessary rate or speed of reciprocation as may be required by law of a given state and the necessary force of vibration as for illustration, in concrete work, which may be required to accomplish the desired task even though the structure to be vibrated may involve tons of weight. Providing the necessary increase of weight and the reciprocation of this increased weight at the legally required speed of reciprocation of the piston to deliver the necessary force of vibration using at the same time only the standard magnitude of fluid pressure for which compressor equipment is commonly designed is the accomplishment of the engine embodying my invention and discovery.

In the modified form of a multiple engine of my invention and discovery as shown in Figs. 20, 21, 22 and 23, the plurality of composite cylinders (six in number) 380, 381, 382, 383, 384, and 385 and composite pistons 386, 387, 388, 389, 390 and 391 (shown by way of illustration and not limitation) are shown disposed in cylinder engine block 393 in a circle and radially of the axis 392 of the assembly. Composite cylinder 380 is formed of cylinder units 380a, 380b, and 380c, and composite cylinder 383 is formed of cylinder units 383a, 383b, and 383c. Composite piston 389 is formed of piston units 389a, 389b, and 389c.

The composite cylinder 380 has a cylinder sleeve 395, cylinder unit 380b has cylinder sleeve 396, and cylinder unit 380c has cylinder sleeve 397. Likewise, the other cylinder units are mounted in sleeves of like construction.

Between the ends of sleeve 395 and 396 is disposed a separator wall 398. Likewise, between the ends of sleeve 396 and 397 is a separator wall 399. In an axial opening 400 in wall 398 is mounted a spacer-aligning member 401.

The piston unit 402 is axially engaged on one end by spacer-aligning member 401, and piston 403 is engaged by the other end of said spacer-aligning member 401. Likewise, pistons 403 and 404, as respects one end portion of each, are engaged by spacer-aligning member 405. Extending axially through said spacer-aligning members 401 and 405 is a bolt 406 on which are fixedly mounted said piston units 402, 403 and 404 and said spacer-aligning members 401 and 405, said bolt having nuts 407 and 408. Each of the other composite pistons have a bolt similar to bolt 406 on which is secured a connector plate 409 with nuts 410, which connector plate unites the action of all the bolts 406 through which is applied the force of the composite pistons disposed in each of the six engine block bores 394.

Cylinder unit 380a has exhaust ports 411 and 412; cylinder unit 380b has exhaust ports 413 and 414; and cylinder unit 380c has exhaust ports 415 and 416. Piston unit 402 has circumferential inlet-exhaust channels 417 and 418, channels 417 and 418 having respectively longitudinal passageways 419 and 420 leading to opposite ends of the piston 402. Piston 402 also has starting orifice 421. Piston 403 is similar to piston 402 and is provided with inlet-exhaust channels and passageways. Cylinder block 393 has axial chamber 422 and also has end closure plates 423 and 424, the latter plate having an opening 425 with threaded walls for connection to a source of fluid pressure, not shown. Said chamber 422 may have a closure wall 426. This chamber 422 functions as a reservoir of compressed fluid medium present to enter promptly into the piston units 402 and 403 as the inlet-exhaust ports 417 and 418 of the piston are opened during reciprocation in registration with cylinder inlet ports or means next to be described.

Through the wall 427 and sleeve 395 of axial chamber 422 is cut a circumferential channel 428 which extends through sleeve 395, as may be seen in Figs. 20 and 22, thereby providing inlet passageways through the cylinder members to inlet-exhaust channels 417 and 418 of the piston.

Similar circumferential channels 429 and 430 are cut in the wall 427 and through the sleeves 396 and 397, providing fluid inlet passageways to the respective pistons in the cylinder units 380b and 380c.

Identical construction of cylinder units and piston units is provided throughout all the engine block bores so that the individual description of the other cylinder units and piston units will not be detailed. The operation of the air in these units is similar to that set forth hereinabove for the in-line multiple engine units of my invention and discovery.

The exhaust channels 411 and 412, 413 and 414, 415 and 416 are radially cut circumferentially in the engine block 393, and said channels are caused to extend inwardly through the cylinder sleeves 305, 306 and 397, providing for the exhaust ports for the cylinder bore within said sleeves. If desired said cylinder sleeves may be omitted. Likewise, the cutting of the inlet channel through the walls 427 and through their respective sleeves provides for exact location and registration of the inlet ports all of which operate to provide for a simple and economical process of manufacture of this modified form of my invention, said modified form, it is manifest, combining all of the action and force of the various composite pistons through the connector plate 409.

This modified form of my invention is characterized by providing for the delivery of heavy hammering blows, and in addition, said blows may be provided at high speed reciprocations; such blows are well adapted to applications such as pile driving, large jack hammers and tamping and vibrators.

Thus, in all forms of the multiple engine of my invention, the separate cylinder units are caused to unite their action in a composite cylinder by means of the composite piston in maintaining or producing the desired high speed and this with the increased shock due to the increased weight of the composite piston over each of the individual weights of the piston units and at the same time using the standard fluid pressure medium at the tool. Moreover, there are applications which involve restriction of the area of the piston or outside diameter of the device to a relatively small area while at the same time the device must deliver a heavy blow or shock at a given high frequency. The multiple engine of my invention supplies the answer by providing a multiple engine which may be of the desired length (see Figs. 4 and 6) to give the desired shock or blow at the desired speed using a relatively small diameter piston. On the other hand, there are applications where the restriction pertains to the length of the device which may be used and the horizontal area of the composite piston may be relatively unrestricted. Here also my invention supplies the answer (see Figs. 20–22).

Another difficulty which may invention and discovery solves is as follows: As stated hereinabove, different tasks require a particular force of vibration and at a particular speed to give a particular vibration characteristic or type of vibration required for that task. Assuming that the particular task in question requires a certain weight of piston to give the required force or shock of vibration and this at a certain high frequency speed, then, if it is attempted to increase the area of the piston by increasing the diameter for total pressure effect, then it will be required to reduce the length of the piston to keep the same within the prescribed weight to effect the desired shock. This attempted solution gives rise to a structural difficulty which renders the solution impractical and inoperative, namely, the length of the piston may be thus so reduced, to provide the desired diameter and piston pressure area and still keep within the given weight of the piston, that the piston will not have a sufficient length to guide it properly in the cylinder, particularly at high speeds. That is, the piston will rock or become askew in the cylinder, rendering it inoperative. The above applies particularly to speeds of a high frequency for a particular job to be done.

In Fig. 24 a very important modified form of my invention and discovery is illustrated—one wherein the piston creates its effect induced by the piston having two directional motions, one rectilinear and one rotary.

The cylinder 450 may have end closure members 451 and 452, one of which if desired may be formed integrally with said cylinder 450. The cylinder 450 preferably has circumferentially disposed exhaust channels 453 and 454. These channels 453 and 454 preferably have a plurality of spaced exhaust passageways 455 and 456 respectively. Cylinder 450 also may have inlet passageways 457 and 458, 459 and 460—said inlet passageways being tangentially disposed with respect to the bore of the cylinder 450.

Piston 461 has turbine-like pockets 462 and 463 disposed in two spaced apart rows throughout the circumference of said piston. Certain of these pockets in each row communicate through their bases and passageways 464 and 465 with the ends respectively of the piston most remote from said pockets. These pockets having such communicating passageways comprise those pockets separated by three or more pockets which are not so connected. Said passageways 464 and 465 are preferably so disposed as to provide for the path of the pressure fluid to be as direct and without any angle or as little change in direction as possible in order to facilitate the passage of the inlet air to the end of the piston and also for the exhausting of the air therefrom.

The piston 461 is fixedly mounted in this modified form upon a shaft 466. The end portions of this shaft are preferably reciprocably mounted in recesses 467 and 468 in the end members 451 and 452 in which are bearings 469 and 470 respectively which are preferably of the so-called "frictionless" type, and on which the shaft bears.

Piston 461 has a weight 471 of a material heavier than the weight of the material of the piston, said weight extending lengthwise of the piston in a narrow portion and is preferably located near the circumference. Instead of a narrow portion, as may be especially suited for high speeds, it is to be understood that the weight may occupy such area as the particular requirements dictate. The purpose of this weight is to provide an unbalanced piston thereby to create vibrations when the piston is rotated. Accordingly the weight of the piston may take various forms so long as the purpose of providing an unbalanced piston is achieved.

Piston 461 has, midway of its length, a very small circumferential starting groove 472 which has a small orifice in communication with passageway 473 which leads to one end of the piston. This is provided to act as a starting means for the piston in the event that the piston comes to rest at dead center, at which time said groove 472 would be in communication with inlet passageways 457–460. This is not the position in which the starting groove is shown in Fig. 24. In Fig. 24 the turbine-like pockets 463 are shown in registration with the inlet passageways 457–460. A small amount of fluid medium would pass to the end of the piston (i.e., chamber 474, which forms one end portion of the cylinder) and create a pressure within the cylinder chamber 474, and would thus move the piston into the opposite chamber 475. In so doing it would move the turbine-like pockets 462 into registration with inlet passageways 457–460 and thus cause the piston to reciprocate.

Simultaneously, it will be noted, the inlet passageways would discharge the fluid pressure medium in a jet-like manner into the turbine-like pockets and thereby cause the piston 461 to revolve on its longitudinal axis, while at the same time reciprocating. Thus there would be vibrations set up by reason of the two directional motions of the piston 461. The passageways 457–460 are preferably of a size to cause the pressure to operate as a jet to create the utmost force against said pockets in causing the piston to revolve and to reciprocate. It will be noted that the piston 461 has its end portions cut away at 476 and 477 so as to greatly reduce the solid length of the piston at the axis, thereby greatly reducing the weight. Also the end closure members 451 and 452 are provided with projecting portions 478 and 479 which extend into the cut away portions in the pistons at 476 and 477 respectively thereby increasing the speed and reducing the pressure fluid volume.

In the modified form which is shown in cross-section in Fig. 26, the construction of the engine is identical to that shown in Figs. 24 and 25 with the following exception: In Fig. 26 cylinder 480 is provided with the plurality of regular spaced exhaust passageways 481 and 482 respectively for the exhausting of the fluid pressure medium from the chambers in the end portions of the piston just as in the structure shown in Figs. 24 and 25. Here said cylinder 480 also has the relief exhaust passageways 483 to relieve the fluid pressure disposed in those turbine-like pockets which do not have communicating passageways with the chambers in the end portion of the cylinder corresponding to 474 and 475 of Fig. 24. There should be at least one relief for each of the inlet passageways 484, 485, 486 and 487. The purpose of these relief passageways 483 is to remove the fluid pressure in those turbine-like pockets which do not have communicating passageways with the end portions of the cylinder. By thus removing the compressed fluid that is entrapped in said turbine-like pockets, the inlet fluid is permitted to discharge its fluid pressure with jet-like force more effectively against the pockets emptied or relieved of the pressure of said compressed air, and thus the utmost effect is secured from such jetting action. Otherwise, the entrapped air would provide a compressible body which would lessen the jetting force. In other words, the rapid movement in jet-like form of the compressed fluid over or momentarily into the pockets and then immediately out through the exhausts 483 provides a very effective turning or spinning force.

In the modified form shown in Fig. 27 the construction of the engine is identical with that shown in Figs. 24 and 25 with the following exception: The cylinder 490 has the regular exhaust passageways 491 and 492 for the exhausting of fluid pressure medium from the end portions of the cylinder as described for the other forms of the motor shown herein. Said cylinder 490, moreover, has inlet passageways 493, 494, 495 and 496 all of which are disposed to discharge their fluid pressure medium tangentially into the cylinder bore against the turbine-like pockets of the piston. However, this modified form of the engine has inlet channel 497 circumferentially disposed in the cylinder 490, said channel being disposed radially and in registration with the turbine-like pockets of the piston at one point of the reciprocation of the piston.

The turbine-like pockets have the passageways 464 and 465 leading from certain of the said turbine-like pockets to the ends of the piston so that the air upon exhausting in this modified form of the invention exhausts from the chambers at the end of the piston when in reciprocation. The mode of operation of the channel 497 is that it provides a continuous rotary pressure upon the various turbine-like pockets, thus keeping the piston rotating on its axis.

In the modified form shown in Fig. 28, the construction of the engine is like that shown in the immediately preceding figures but differs in that the piston 500 is mounted upon two stub shafts 501 and 502 which in turn are mounted on or formed integrally with the end closure members 503 and 504 respectively. Preferably the piston is mounted upon frictionless bearings 505 and 506 which are secured in piston 500 by lock rings 507 and 508 respectively, the piston 500 having a divided wall 509 which insures the separation of the end chambers of the cylinder, which is identical in construction to that in Fig. 24. In this form the piston 500 reciprocates in a rectilinear manner upon the stub shafts 501 and 502, while simultaneously revolving or spinning upon said bearings 505 and 506, i.e., the piston rotates about its longitudinal axis thus providing a two-direction motion for the piston—rectilinear and rotary. In this modified form the stub shafts are stationary and do not reciprocate.

In the modified form shown in Fig. 29 the shaft 520 is fixedly mounted in the end enclosure members 521 and 522 and extends throughout the length of the device. On this fixedly mounted shaft 520 the piston 523 is mounted on frictionless bearings 524 and 525, located in each end of the piston, said bearings being held in position by lock rings 526 and 527. The piston 523 also has, midway of its length, an O-ring 528 which serves to seal off the cylinder chambers in the end portions of the cylinder and thereby keep the fluid pressure medium developed in one of said chambers from passing axially to the chamber at the other end of the cylinder.

In the modified form shown in Fig. 30 is illustrated the form of motor shown in Fig. 24. However, in this instance it is mounted in a multiple engine so that the force of the one unit may be added to that of the other units, the general mounting being similar to that in the multiple engine of Fig. 4. That is, the piston construction has two motions, one rectilinear and one rotary as shown in a multiple engine form.

The composite cylinder member 530 is formed of cylinder units 531 and 532, separated by separator and divider wall 534 which has an axial opening in which is located the bearing 535 through which the shaft 536 extends with its end portion shown as mounted in bearing 537 in end enclosure member 538. This separator divider wall is constructed in two halves in order to permit its assembly on the shaft 536; its construction is similar to that of the separator divider wall shown in Fig. 7. The other end portion of the shaft 536 may be similarly mounted but is not shown since it is broken away.

Thus the shaft 536 is reciprocatingly and rotatably mounted in said bearings 535 and 537. The pistons 539 and 540 of identical construction to piston 461 of Fig. 24 are fixedly mounted upon shaft 536. Thus the shaft 536 is subject to being reciprocated and rotated by pistons 539 and 540 under their combined force, i.e., under the combined force of the multiple engine. The shaft 536 is illustrated broken away to indicate other like pistons and cylinders to 539 and 540 may be added. Thus a composite piston member, is formed of piston units 539 and 540 or as many as may be required to give the desired force or shock.

The mode of operation of this modified form of the turbine-like pockets and the passageways for the fluid pressure medium is all the same as indicated for Fig. 24.

The modified form shown in Fig. 31 is a very simplified form wherein the piston 550 is shown without any mounting shaft. This is mounted in the cylinder 551 with end closures 552 and 553. Said piston 550 has turbine-like pockets and passageways similar in all respects to those shown in Fig. 24. In this form the piston is cylindrical, i.e., it does not have the ends cut away to reduce the weight. This form of my invention has a piston of greater weight than that shown in Fig. 24 where the measurements otherwise are equal. This form of the device would be found particularly applicable as a vibrator where a vibration effect is required which vibration effect is induced by a piston having two motions—one rectilinear and one rotary. It is to be understood that all these pistons are provided with weights on one side to produce the unbalanced piston for use in vibrators.

In Fig. 32, the modified form is of an engine having one end of the piston 560 of the hill and valley type, with land 561, with relatively wide channel 562, inlet-exhaust ports 563, and passageways 564 connecting said ports with end portions 565 and 566 of cylinder 567. On the opposite end turbine-like pockets 568 are provided with inlet-exhaust ports 569 and passageways 570 for every other of such pockets whereby rotary motion is imparted to the piston 560, as well as rectilinear motion while in reciprocation. Cylinder 567 has tangential inlet ports or means 571 as in the engine shown in Fig. 24, and exhaust ports or means 572 and 573 in spaced relation on each side thereof. Weight 574 provides an unbalanced piston in connection with the rotary motion of the piston where such unbalanced condition is required. Otherwise such weight may be omitted.

In Fig. 33, the modified form of engine has cylinder 580 with tangential inlet ports 581 as in the engine shown in Fig. 24 and exhaust ports or means 582. Piston 583 has end lands 584 and 585, with intermediate land 586, on each side of which are relatively wide channels 587 and 588. In channel 587 are inlet-exhaust ports 589 with passageways 590. In channel 588 are inlet-exhaust ports 591 with passageways 592. In the intermediate land 586 are a plurality of turbine-like pockets 593 without passageways, said pockets being subject to blasts of inlet fluid pressure medium upon each reciprocation, i.e., twice as often as the ports 587 or 588. This arrangement provides a rotary motion for the piston 583 while in reciprocation. Weight 594 provides an unbalanced piston in connection with the rotary motion of the piston, where such unbalanced condition is required. Otherwise such weight may be omitted.

In the above Figs. 24–33 the number of tangential inlet means is shown as four for illustration. But such number may be more or less as desired or as required for optimum results for a given application. Also, be it noted, the weight for the piston may be omitted in all of the above rotary pistons where the unbalanced condition is not required. In any figure where the starting orifice and its passageway are not shown, it is to be understood that the same may be applied as in the figure where said starting orifice is illustrated.

I claim:

1. A fluid pressure operated engine comprising a composite cylinder member formed of a plurality of individually complete cylinder units, each of which units has an inlet fluid pressure means, exhaust means disposed on each side of said inlet pressure means, and end walls for said cylinder member; a dividing-separating wall between said units having a longitudinal axial opening therethrough; means connecting said cylinder units, dividing-separating wall and end walls in assembled position; and a composite piston member disposed in said composite cylinder member, said piston member being formed of individually complete piston units, each of which units is reciprocably disposed in one of said cylinder units which units are rigidly connected with each other in forming said composite piston member—each said piston unit having two pressure areas, one on each outermost end thereof, and each said piston unit having a plurality of inlet-exhaust ports periodically registrable with said inlet and exhaust means of said cylinder units during reciprocation and disposed in spaced relation between the ends of said piston unit and passageways within each said piston unit extending from each of said inlet-exhaust ports to that end of the piston most remote thereto.

2. A fluid pressure operated engine comprising a composite cylinder member formed of a plurality of individually complete cylinder units, each of which units has an inlet fluid pressure means, and exhaust means disposed on each side of said inlet pressure means; end walls for said cylinder member; a dividing-separating wall between said units having a longitudinal axial opening therein; and a composite piston member disposed in said composite cylinder member comprising a plurality of individually complete piston units each of which is reciprocably disposed in one of said cylinder units, each of said units having a longitudinally axially disposed opening therethrough, a spacer member slidably disposed in said dividing-separating wall and bearing against a portion of the end faces of the piston units, said spacer member having a longitudinally axially disposed opening therethrough, and a connector member extending through the longitudinal axial opening in said piston units and said spacer members in joining said piston units into said composite piston member, each of said piston units having a plurality of inlet-exhaust ports disposed in spaced relation between the ends of said piston units and longitudinal passageways within said piston units extending from each of said inlet-exhaust ports to that end of the piston most remote thereto.

3. A fluid pressure operated engine comprising a composite cylinder member formed of a plurality of individually complete cylinder units, each of which units has an inlet fluid pressure means and exhaust means disposed on each side of said inlet pressure means, and longitudinally disposed securing bolt passageways through the marginal portions of said units; end walls for said composite cylinder member having a plurality of securing bolt holes angularly disposed with respect to the center of said wall and disposed in the marginal portion of said wall in registration with said securing bolt passegeways in said cylinder units; securing bolts disposed in said holes of said units and said end walls in forming said composite cylinder; a dividing-separating wall between said units having a longitudinal axial opening therethrough; and a composite piston member disposed in said composite cylinder member comprising a plurality of individually complete piston units each of which units is reciprocably disposed in one of said cylinder units, each of said units having a longitudinally axially disposed opening therethrough, each of said piston units being provided with an axially disposed recess concentric with the opening therethrough, a spacer-aligning member slidably disposed in said dividing-separating wall and having its end portions fittingly engaging in the recesses of said piston unit, said spacer-aligning member having a longitudinally axially disposed opening therethrough, and a connector member extending through the longitudinal axial opening in said piston units and said spacer-aligning members in joining said piston units to form said composite piston member, each of said piston units having a plurality of inlet-exhaust ports periodically registrable with said inlet and exhaust means of said cylinder units during reciprocation and disposed in spaced relation between the ends of said piston unit and longitudinal passageways within said piston unit extending from each of said inlet-exhaust ports to that end of the piston most remote thereto.

4. A fluid pressure operated engine comprising a composite cylinder member formed of a plurality of individually complete cylinder units each of which units has an inlet fluid pressure means, and an exhaust means disposed on each side of said inlet pressure means; end walls for said cylinder member; a dividing-separating wall between said units having a longitudinal axial opening therethrough; means connecting said cylinder units, dividing-separating wall, and end walls; and a composite piston member disposed in said composite cylinder member, said composite piston member comprising individually complete piston units formed integrally with spacer portions between said piston units, each unit having two pressure areas one on each outermost end thereof, each of said units having a plurality of inlet-exhaust ports periodically registrable with said inlet and exhaust means of said cylinder units during reciprocation and disposed in spaced relation between the ends of said piston unit and longitudinal passageways within said piston unit extending from each of said inlet-exhaust ports to that end of the piston most remote thereto.

5. In a fluid pressure operated engine a reciprocating piston having a plurality of inlet-exhaust ports disposed in spaced relation between the ends of said piston unit, said ports being in the form of separate pockets extending circumferentially in the face of the piston and located in a circle the plane of which is normal to the axis of the piston, and passageways within said piston unit extending respectively to each end of the piston from a side wall of each of said inlet-exhaust pockets directly to that end of the piston most remote thereto at an angle to the longitudinal axis of the piston in providing for rapid flowing of the fluid medium.

6. In a fluid pressure operated engine a reciprocating piston unit having an axially disposed opening therethrough, and each end face provided with an axially concentric recess; a filler member removably disposable within said recess for operating said piston unit as a single piston and in providing a piston unit which may be assembled on an axially disposed uniting connector means with like cylindrical constructed piston units in forming an extended composite piston member; and a plurality of separate inlet-exhaust ports in said piston unit disposed in spaced relation between the ends of said piston unit and longitudinal passageways within said piston unit extending respectively to each end of the piston from each of said inlet-exhaust ports to that end of the piston most remote thereto.

7. In a fluid pressure operated engine the combination of a demountable cylinder unit and a reciprocating piston unit disposable in said demountable cylinder unit, said piston unit having a plurality of separate inlet-exhaust ports in said piston unit disposed in spaced relation between the ends of said piston unit and passageways within said piston unit extending respectively to each end of the piston from each of said inlet-exhaust ports to that end of the piston most remote thereto.

8. In a fluid pressure operated engine a reciprocating composite piston member formed of a plurality of individually complete piston units, each unit having an axially disposed opening therethrough, each of said piston units being provided with an axially disposed recess concentric with the opening therethrough; a spacer-aligning member having its end portions disposed in the said recesses of adjacent piston units; and a connector member disposed in said axial opening in providing a composite piston member formed of a plurality of said piston units.

9. A fluid pressure operated engine comprising an engine block having an axial inlet fluid pressure chamber extending for the major portion of the length thereof; a plurality of cylinder bores disposed radially of the axis of said block in the circumferential portion thereof, each of said bores being provided with inlet pressure means in its central portion longitudinally considered and communicating with said inlet fluid pressure chamber bore and exhaust means communicating with the atmosphere located on each side of a radial plane through said inlet means; a piston reciprocably mounted in each of said cylinder bores having inlet-exhaust ports periodically registrable with the inlet and exhaust means of each of said cylinder bores during reciprocation, said ports being disposed between the ends thereof which ports have longitudinal passageways leading to that end of the piston most remote thereto, said piston having on one end portion a piston extension; a first end plate fixedly mounted on one end of the engine block closing one end of each of said cylinder bores, said plate having openings in said plate registering with and each fixedly receiving the extension of the said pistons; a second plate fixedly mounted on the extensions of said pistons, said plate functioning to unite the reciprocation of said fluid pressure engine pistons; and a third plate fixedly mounted on the opposite end of said engine block and closing the cylinder bores and the axial inlet pressure chamber bore, said plate having an opening registering with said inlet pressure chamber bore through which opening pressure fluid medium may be admitted from a suitable source of fluid pressure.

10. A fluid pressure operated engine comprising an engine block having an axial inlet fluid pressure chamber extending for the major portion of the length thereof; a plurality of cylinder bores disposed radially of the axis of said block and in the circumferential portion thereof, each of said bores being provided with inlet pressure means in its central portion longitudinally considered and communicating with said inlet fluid pressure chamber bores and exhaust means on each side of the radial plane through said inlet means communicating with the atmosphere; a cylindrical sleeve fittingly mounted in each of said bores, said sleeve having inlet ports disposed in its circumferential portion registrable with the inlet means of said engine block, and said sleeve also having exhaust ports disposed in its circumferential portion registrable with the exhaust means of each of said engine bores; a piston reciprocably mounted in said sleeve having inlet-exhaust ports periodically registrable with the inlet means of each of said sleeves, said ports being disposed between the ends of said piston, which ports have longitudinal passageways leading to that end of the piston most remote from the respective said port, said piston having on one end portion a piston extension; a first end plate fixedly mounted on one end of the engine block closing one end of each of said cylinder bores, said plate having openings in said plate registering with and each fixedly receiving the extension of the respective said pistons; a second plate fixedly mounted on the respective extension of said piston, said plate functioning to unite the reciprocation of said fluid pressure engine pistons; and a third plate fixedly mounted on the opposite end of said engine block and closing the cylinder bores and the axial inlet pressure chamber bore, said plate having an opening registering with said inlet pressure chamber bore through which opening pressure fluid medium may be admitted from a suitable source of fluid pressure.

11. A fluid pressure operated engine comprising an engine block having an axial inlet fluid pressure chamber extending for the major portion of the length thereof;

a plurality of cylinder bores disposed radially of the axis of said block in the circumferential portion thereof, each of said bores forming a composite cylinder member formed of separate cylinder units in end to end relation provided with a separating wall between each of said cylinder units, and each of said cylinders being provided with inlet pressure means in its central portion longitudinally considered and each communicating with said inlet fluid pressure chamber bore, and exhaust means communicating with the atmosphere located on each side of the radial plane through said inlet means in each cylinder in providing a composite multiple engine cylinder member; a composite piston member reciprocably mounted in each of said cylinder bores formed of piston units in end to end relation, each of which units is disposed in one of said cylinder units, each of said piston units having inlet-exhaust ports periodically registrable with the inlet means of each of said cylinder units, said ports being disposed between the ends of said piston units, which ports have longitudinal passageways leading to that end of the piston unit most remote from the respective said port, and each of said composite pistons having a piston extension; a first end plate fixedly mounted on one end of the engine block closing one end of each of said cylinder bores, said plate having openings in said plate registering with and each slidably receiving the extension of the respective said pistons; a second plate fixedly mounted on the respective extensions of said composite pistons, said plate functioning to unite the reciprocation of said composite pistons; and a third plate fixedly mounted on the opposite end of said engine block and closing the cylinder bores and the axial inlet pressure chamber bore, said plate having an opening registering with said inlet pressure chamber through which opening pressure fluid medium may be admitted from a suitable source of fluid pressure.

12. A fluid pressure operated engine comprising a cylinder having a cylinder bore and a fluid pressure inlet passageway tangentially communicating with said bore; a piston reciprocably and rotatably mounted in said bore, which piston has turbine-like pockets circumferentially disposed in a circle about said piston, the plane of which circle is normal to the axis of the piston and inlet-exhaust ports in said turbine-like pockets, passageways connecting said ports with that end of the piston most remote thereto, and weight means transversely disposed across a narrow portion of the circumferential portion of said piston in providing an unbalanced piston and in providing a piston which is characterized by having two motions—one rectilinear and one rotary.

13. A fluid pressure operated engine comprising a cylinder having end plates, a cylinder bore and fluid pressure inlet passageways tangentially communicating with said bore, each of said end plates having piston shaft mounting recesses; a piston reciprocably and rotatably mounted in said bore which piston has turbine-like pockets circumferentially disposed in a circle about said piston, the plane of which circle is normal to the axis of the piston, inlet-exhaust ports in said turbine-like pockets and passageways connecting said ports with that end of the piston most remote thereto; a piston shaft on which said piston is mounted and guided said shaft having portions thereof disposed in said shaft mounting recesses; and weight means transversely disposed across a narrow portion of the circumferential portion of said piston in providing an unbalanced piston and in providing a piston which is characterized by having two motions—one rectilinear and one rotary.

14. A fluid pressure operated engine comprising a cylinder having end plates, a cylinder bore and fluid pressure inlet passageways tangentially communicating with said bore, each of said end plates having a piston shaft mounting recess; a piston reciprocably and rotatably mounted in said bore, which piston has turbine-like pockets circumferentially disposed in a circle about said piston, the plane of which circle is normal to the axis of said piston, inlet-exhaust ports in said turbine-like pockets and passageways connecting said ports with that end of the piston most remote thereto; a piston shaft on which said piston is fixedly mounted and guided in axial and in rotary movement said shaft having portions thereof disposed in said shaft mounting recesses; and weight means transversely disposed across a narrow portion of the circumferential portion of said piston in providing an unbalanced piston and in providing a piston which is characterized by having two motions—one rectilinear and one rotary.

15. A fluid pressure operated engine comprising a cylinder having end plates, a cylinder bore and fluid pressure inlet passageways tangentially communicating with said bore, each of said end plates having a piston shaft mounting recess; a piston reciprocably and rotatably mounted in said bore, which piston has turbine-like pockets circumferentially disposed in a circle about said piston, the plane of which circle is normal to the axis of the piston, inlet-exhaust ports in said turbine-like pockets, and passageways connecting said ports with that end of the piston most remote thereto, said piston having a centrally (longitudinally considered) located air seal and a bearing on each side of said seal; a piston shaft on which said piston is slidably and revolvably mounted; and weight means transversely disposed across a narrow portion of the circumferential portion of said piston in providing an unbalanced piston and in providing a piston which is characterized by having two motions—one rectilinear and one rotary.

16. A fluid pressure operated engine comprising a cylinder having end plates, a cylinder bore and fluid pressure inlet passageways tangentially communicating with said bore, each of said end plates having a piston mounting stub shaft; a piston reciprocably and rotatably mounted in said bore, which piston has turbine-like pockets circumferentially disposed in a circle about said piston, said pockets being disposed in a plane at right angles to the axis of the piston, inlet-exhaust ports in said turbine-like pockets, and passageways connecting said ports with that end of the piston most remote thereto, said piston having a centrally (longitudinally considered) located air seal wall and a shaft mounting recess on each side of said seal wall; a piston shaft on which said piston is revolvably mounted, and weight means transversely disposed across a narrow portion of the circumferential portion of said piston in providing an unbalanced piston and in providing a piston which is characterized by having two motions— one rectilinear and one rotary.

17. A fluid pressure operated engine comprising a cylinder having a cylinder bore, a plurality of fluid pressure inlet passageways tangentially communicating with said bore and disposed in a circle normal to the axis of said bore, and exhaust passageways leading from said bore located in said circle and between said inlet passageways; a piston reciprocably and rotatably mounted in said bore, which piston has turbine-line pockets circumferentially disposed in a circle about said piston, the plane of which circle is normal to the axis of the piston and inlet-exhaust ports in said turbine-like pockets, and passageways connecting said ports with that end of the piston most remote thereto; and weight means transversely disposed across a narrow portion of the circumferential portion of said piston in providing an unbalanced piston and in providing a piston which is characterized by having two motions—one rectilinear and one rotary.

18. In a fluid pressure operated engine, a reciprocating piston formed of a cylindrical piston unit having an axially disposed opening therethrough and a piston shaft passing through said opening and fixed to said piston unit in providing a piston unit which may be assembled with like cylindrical piston units having a piston shaft in common forming a composite piston member, said engine further having cylinder means and head closure members in which said piston shaft is guided in axial and rotary movement by shaft mounting recesses in said head closure members.

19. In a fluid pressure operated engine, the combination comprising a composite cylinder member formed of a plurality of end to end arranged cylinder units having intermediately arranged dividing-separating wall closure members and end arranged closure members having axial shaft mounting recesses, and a piston member being formed of individually piston units fixably mounted on a common shaft movably mounted in recesses in said end cylinder closure members and movably supported by axial opening in said dividing-separating wall closure members.

20. In a fluid pressure engine the combination comprising an engine cylinder; end closure members for said cylinder having raised faces inwardly directed; a piston unit of cylindrical form disposed in said cylinder having recessed end faces registrable with said raised faces in effectively reducing the length of the solid axial portion of said piston.

21. A fluid pressure operated engine comprising a cylinder having a cylinder bore, a plurality of fluid pressure inlet passages tangentially communicating with said bore and disposed in a circle normal to the axis of said bore, a piston reciprocably and rotatably mounted in said bore, which piston has turbine-like pockets circumferentially disposed in a circle about said piston, the plane of said circle being normal to the axis of the piston, inlet-exhaust ports in said turbine-like pockets, passageways communicating said ports with that end of the piston most remote thereto, and weight means disposed adjacent a circumferential portion of said piston in providing an unbalanced piston and in providing a piston which is characterized by having both rectilinear and rotary motion.

22. In a fluid pressure operated engine, a reciprocating piston formed of a cylindrical piston unit having an axially disposed opening therethrough and axially concentric recess in each end face; a filler member removably disposable within said recesses for operating as a single piston member and in providing a piston unit which may be assembled with like cylindrical piston units having a piston shaft in common forming a composite piston member; and a plurality of inlet-exhaust ports in each said piston unit disposed in spaced relation between the ends of said piston unit and longitudinal passageways within said piston unit extending from each of said inlet-exhaust ports to that end of the piston unit most remote thereto.

23. In a fluid pressure operated engine, a reciprocating piston developing compound rectilinear and rotary motion, said piston having circumferentially disclosed turbine-like pockets with inlet-exhaust ports communicating said pockets with the piston end most remote therefrom, off-center weight means unbalancing said piston, and means delivering fluid under pressure tangentially against said turbine-like pockets to generate both rectilinear and rotary motion of said piston.

24. An engine according to claim 23, wherein such piston has the pressure faces thereof multiplied, each such pressure face cyclically communicating with a common source of inlet fluid pressure medium, and each such pressure face cyclically exhausting said fluid medium from each pressure face to atmosphere.

25. In a valveless high speed fluid pressure operated high power automatic reciprocating engine, the combination of a composite valveless high speed reciprocated piston assembly for a plurality of ganged pistons each having opposed faces, one set of such faces facing in one direction of reciprocation and the other set of faces facing in the other direction of reciprocation; a cylinder compartment forming wall; and means synchronously cyclically and automatically delivering fluid medium first to one set of such faces and then to the other set of such faces at high speed.

26. In a valveless high speed fluid pressure operated high power automatic reciprocating engine, the combination of a composite valveless high speed reciprocated piston assembly for a plurality of ganged pistons each having opposed faces, one set of such faces facing in one direction of reciprocation and the other set of faces facing in the other direction of reciprocation; a cylinder compartment forming wall; a composite cylinder formed of a plurality of individually complete cylinder units each of which units is formed of matching duplicating parts with a dividing separating wall between said units formed of matching half parts and each unit having an inlet fluid pressure means and exhaust means disposed in spaced relation on each side of said inlet pressure means; and end walls for said composite cylinder.

References Cited in the file of this patent

UNITED STATES PATENTS

| 906,240 | Kreger | Dec. 8, 1908 |
| 2,383,082 | Rossman | Aug. 21, 1945 |
| 2,513,546 | Alleslander | June 4, 1950 |

FOREIGN PATENTS

| 212,744 | Germany | Aug. 10, 1909 |